(12) United States Patent
York (10) Patent No.: US 12,162,400 B1
(45) Date of Patent: Dec. 10, 2024

(54) AUXILIARY LIGHTING SYSTEMS AND METHODS FOR VEHICLES

(71) Applicant: VLEDS, INC., Bellingham, WA (US)

(72) Inventor: Jacob York, Ferndale, WA (US)

(73) Assignee: VLEDS, INC., Bellingham, WA (US)

( * ) Notice: Subject to any disclaimer, the term of this patent is extended or adjusted under 35 U.S.C. 154(b) by 0 days.

(21) Appl. No.: 18/493,054

(22) Filed: Oct. 24, 2023

Related U.S. Application Data

(60) Provisional application No. 63/380,797, filed on Oct. 25, 2022.

(51) Int. Cl.
| | |
|---|---|
| *B60Q 1/26* | (2006.01) |
| *F21S 41/151* | (2018.01) |
| *F21S 43/14* | (2018.01) |
| *F21Y 115/10* | (2016.01) |

(52) U.S. Cl.
CPC .......... *B60Q 1/2696* (2013.01); *F21S 41/151* (2018.01); *F21S 43/14* (2018.01); *F21Y 2115/10* (2016.08)

(58) Field of Classification Search
CPC .......... B60Q 1/2696; B60Q 1/56; F21S 43/26
See application file for complete search history.

(56) References Cited

U.S. PATENT DOCUMENTS

| | | | |
|---|---|---|---|
| 2011/0237090 A1* | 9/2011 | Ehrlich | B60Q 1/0088 439/36 |
| 2016/0001700 A1* | 1/2016 | Salter | H05B 47/115 362/543 |
| 2018/0312105 A1* | 11/2018 | Bartell | G08B 5/38 |

* cited by examiner

*Primary Examiner* — Eric T Eide
(74) *Attorney, Agent, or Firm* — Michael R. Schacht; Schacht Law Office, Inc.

(57) ABSTRACT

An auxiliary light assembly comprises a light assembly, a driver controller, and at least three conductors. The light assembly comprises a light panel assembly configured to support at least first and second sets of light sources. The driver controller is operatively connected between a vehicle light control system and the light panel assembly. The conductors are operatively connected to the driver controller. The driver controller generates at least first and second auxiliary light control signals based on the vehicle light control signals, where the at least first and second auxiliary light control signals differ from the vehicle light control signals. The at least three conductors carry the at least first and second auxiliary light control signals to the light assembly such that the first auxiliary light control signal operates the first set of light sources and the second auxiliary light control signal operates the second set of light sources.

16 Claims, 12 Drawing Sheets

AUXILIARY LIGHTING SYSTEMS AND METHODS FOR VEHICLES

RELATED APPLICATIONS

This application, U.S. patent application Ser. No. 18/493,054 filed Oct. 24, 2023, claims benefit of U.S. Provisional Application Ser. No. 63/380,797 filed Oct. 25, 2022, the contents of which are incorporated herein by reference.

TECHNICAL FIELD

The present invention relates to lighting systems for vehicles and, more specifically, to auxiliary lighting systems configured to be integrated into existing vehicle systems.

BACKGROUND

Vehicle owners often modify their vehicle(s) from original factory condition for functional and/or aesthetic reasons. One class of vehicle modification system is to install one or more auxiliary vehicle lighting systems on the vehicle. As examples, vehicles are often modified to have auxiliary lighting systems including one or more of fog lights, trailer lights, lighted signs, running lights, lighted license plate holders, and the like.

As manufactured, vehicles typically have an electrical system containing operator input systems, control systems, and wiring systems that operate factory installed lighting systems. The electrical system on the vehicle as manufactured will be referred to herein as the original equipment manufacturer (OEM) electrical system.

Auxiliary lighting systems are typically integrated into the OEM electrical system in some fashion. At a minimum, power for auxiliary lighting systems is typically obtained by tapping into the wiring of the OEM electrical system. In addition, some auxiliary lighting systems operate based on the control systems of the OEM electrical system. In this case, control signals present on the wiring system of the OEM electrical system are used to control the lighting of the auxiliary lighting system. One common example is that trailer lighting systems are typically hardwired into the OEM electrical system such that turn signal lights, brake lights, and running rights on the trailer are operated based on control signals present on the wiring system of the OEM electrical system.

One class of vehicle lighting system were additional (or auxiliary) reverse or brake lights operated by the control signals of the OEM electrical system available on the OEM wiring system. Such conventional auxiliary lighting systems were single circuit system systems limited to a particular function (e.g., reverse signal, brake signal), and the generated light was only visible under specific conditions directly controlled by the OEM electrical system.

The need exists for auxiliary vehicle lighting systems that, based on control signals of the OEM electrical system, generate light signals that add functionality beyond simply duplicating the light signals generated by the OEM electrical system.

SUMMARY OF THE INVENTION

The present invention may be embodied as an auxiliary lighting system for a vehicle comprising a vehicle light control system for generating a set of vehicle light control signals, the auxiliary light assembly comprising a light assembly, a driver controller, and at least three conductors. The light assembly is adapted to be secured at a desired location on the vehicle and comprises a light panel assembly configured to support at least first and second sets of light sources. The driver controller is operatively connected between the vehicle light control system and the light panel assembly. The at least three conductors are operatively connected to the driver controller. The driver controller generates at least first and second auxiliary light control signals based on the vehicle light control signals, where the at least first and second auxiliary light control signals differ from the vehicle light control signals. The at least three conductors carry the at least first and second auxiliary light control signals to the light assembly such that the first auxiliary light control signal operates the first set of light sources and the second auxiliary light control signal operates the second set of light sources.

The present may also be embodied as a method of providing auxiliary light signal patterns for a vehicle comprising a vehicle light control system for generating a set of vehicle light control signals comprising the following steps. A light assembly is secured at a desired location on the vehicle. The light assembly comprises a light panel assembly configured to support at least first and second sets of light sources. A driver controller is operatively connected to the vehicle light control system and the light panel assembly by at least three conductors extending between the driver controller and the light panel assembly. The driver controller is operated to generate at least first and second auxiliary light control signals based on the vehicle light control signals, where the at least first and second auxiliary light control signals differ from the vehicle light control signals. The at least three conductors are arranged to carry the at least first and second auxiliary light control signals from the driver controller to the light assembly such that the first auxiliary light control signal operates the first set of light sources and the second auxiliary light control signal operates the second set of light sources.

The present invention may be embodied as an auxiliary lighting system for a vehicle comprising a vehicle light control system for generating a set of vehicle light control signals. The auxiliary light assembly comprises a light assembly, a light panel assembly, a driver controller, and at least three conductors. The light assembly comprises a light housing adapted to be secured at a desired location on the vehicle and a light panel assembly comprising a light panel configured to support at least first and second sets of light sources and a lens member. The driver controller is operatively connected to the vehicle light control system. The at least three conductors extend between the driver controller and the light sources of light panel assembly. The driver controller generates at least first and second auxiliary light control signals based on the vehicle light control signals, where the at least first and second auxiliary light control signals differ from the vehicle light control signals. The at least three conductors carry the at least first and second auxiliary light control signals to the light assembly such that the first auxiliary light control signal operates the first set of light sources and the second auxiliary light control signal operates the second set of light sources.

DETAILED DESCRIPTION

The principles of the present invention may be embodied in different forms, and several example embodiments of auxiliary lighting systems for vehicles will be described below.

I. First Example Auxiliary Lighting System

Figure 1:
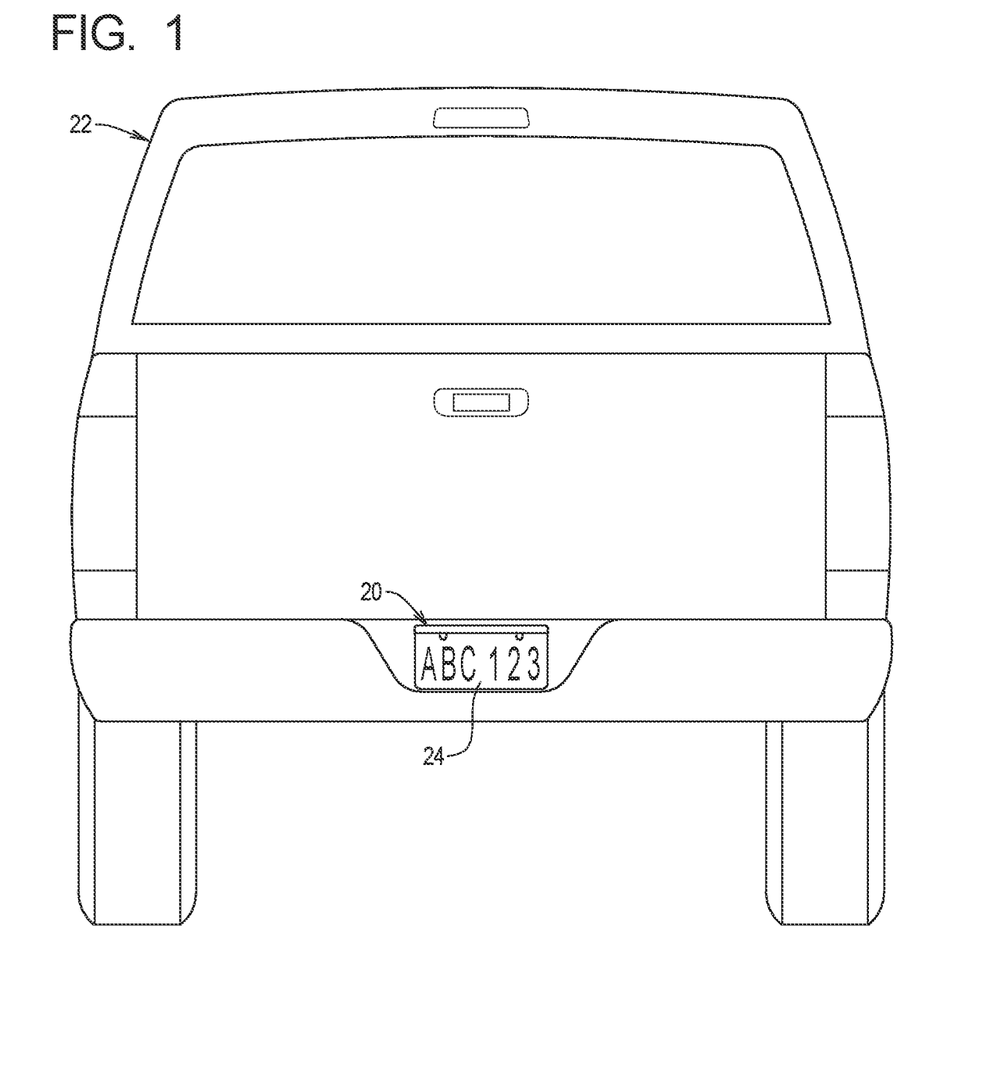
FIG. 1 is a rear elevation view of an example vehicle supporting a first example light assembly of a first example lighting system of the present invention.
Figure 4:
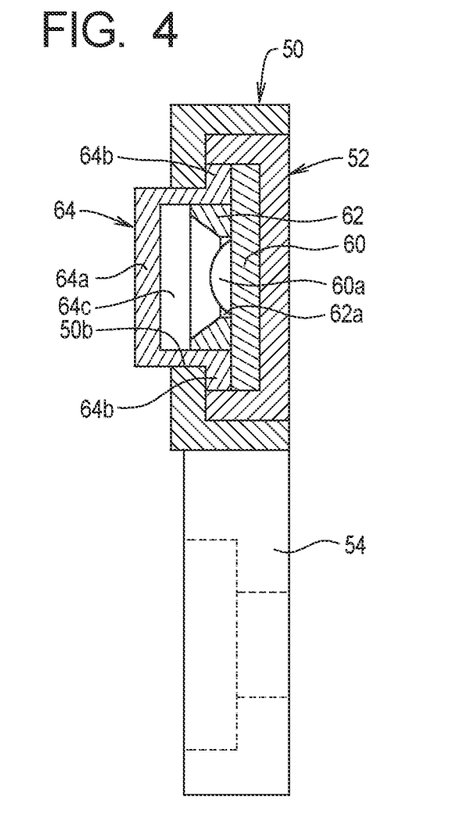
FIG. 4 is a section view taken along lines 4-4 in FIG. 2.
Figure 5:
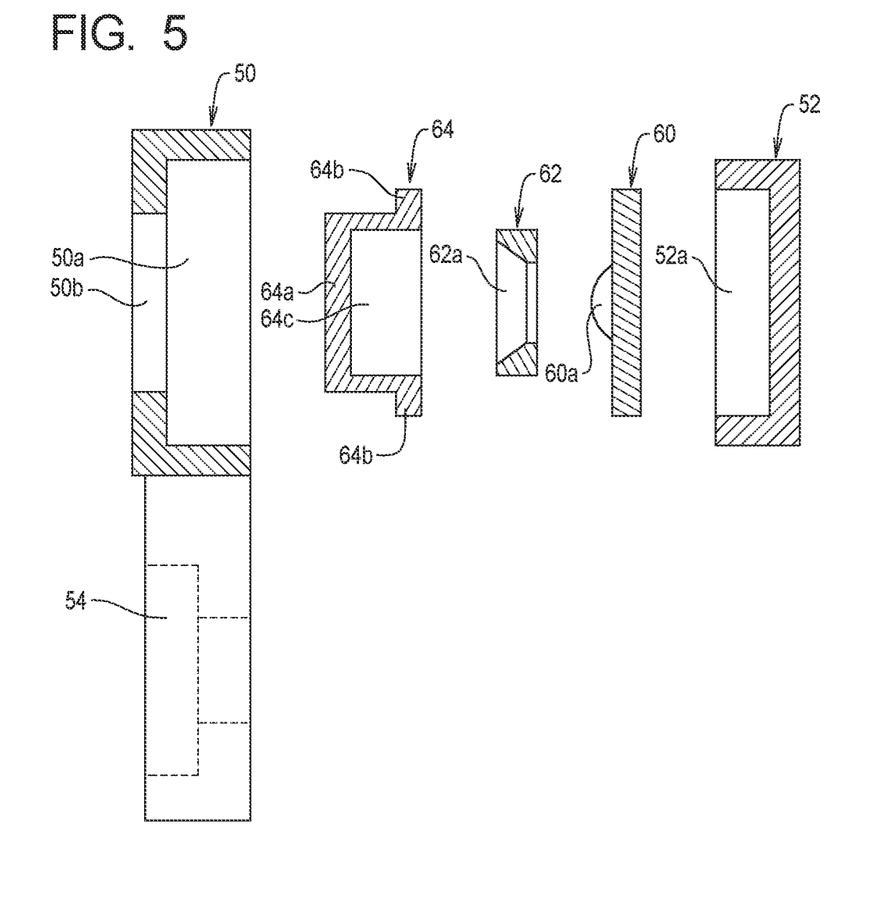
FIG. 5 is an exploded section similar to FIG. 4.
Figure 6:
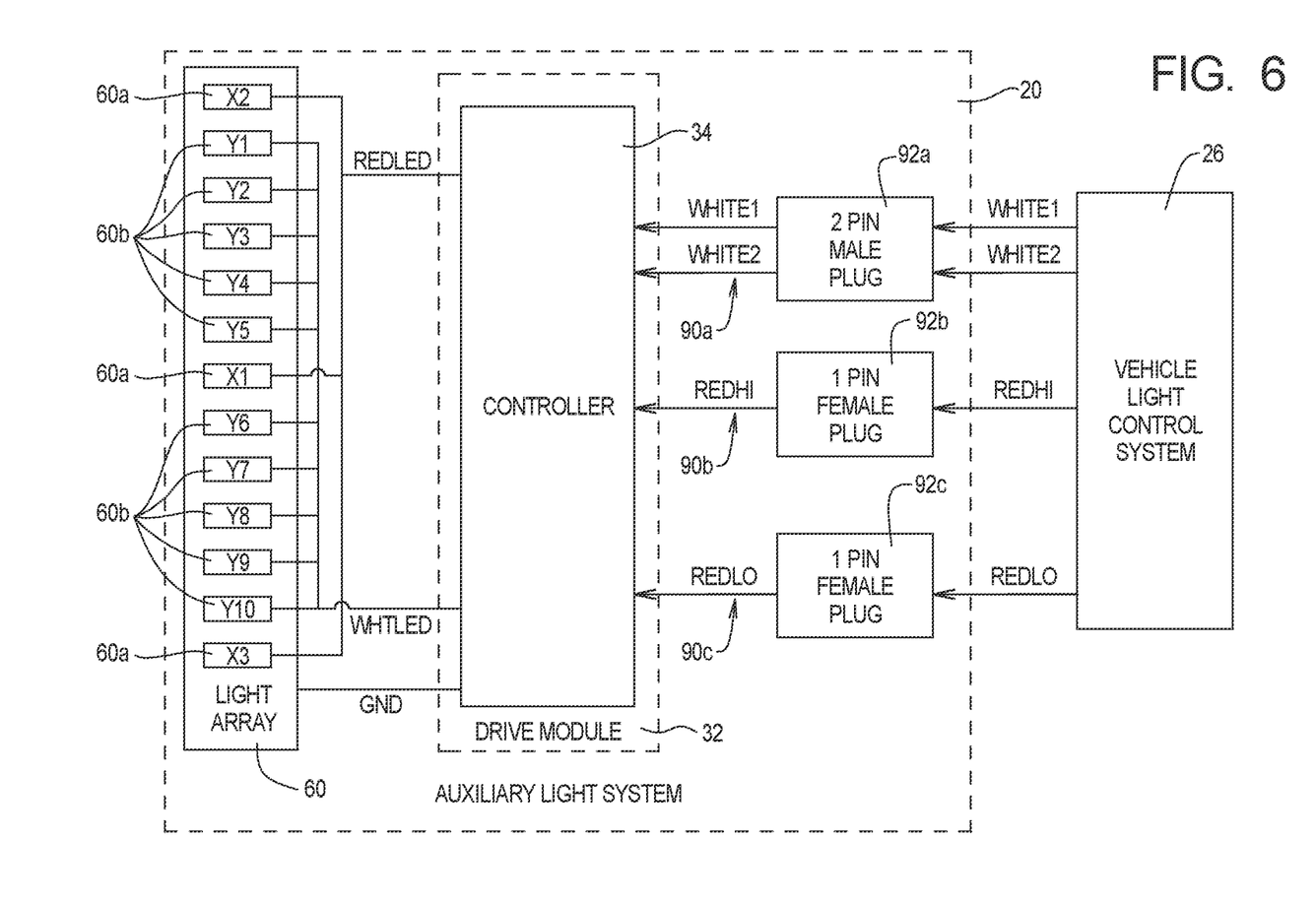
FIG. 6 is a schematic block diagram of first example electrical system that may be used by the first example light assembly.

Referring initially to FIGS. 1-6 of the drawing, depicted at 20 therein is a first example auxiliary lighting system constructed in accordance with, and embodying, the principles of the present invention. The first example auxiliary lighting system 20 is adapted to be mounted on a first example vehicle 22 adjacent to a license plate 24 also mounted on the first example vehicle 22. The first example vehicle 22 depicted in FIG. 1 is a truck, and the first example auxiliary lighting system 20 is secured to a bumper of the truck. The first example vehicle 22 further comprises a vehicle light control system 26 as shown in FIG. 6 of the drawing. The first example vehicle 22, license plate 24, and the example vehicle light control system 26 are or may be conventional and are disclosed herein only to that extent helpful to a complete understanding of the present invention.

The first example auxiliary lighting system 20 comprises a first example light assembly 30 and a first example driver module 32. The example driver module 32 comprises a driver controller 34 configured to be connected between the example vehicle light control system 26 and the first example light assembly 30 such that the first example light assembly generates a plurality (two or more) light signal patterns based on a status of signals generated by the example vehicle light control system 26. Further, the example driver module 32 is configured such that at least one of the light patterns generated by the light assembly 30 is derived from, but not determined by, the status of the signals generated by the example vehicle light control system 26. The first example lighting assembly 20 is thus configured to control the first example light assembly 30 to generate functional and/or aesthetic light signal patterns beyond the light signal patterns generated by the example vehicle light control system 26 of the first example vehicle 22.

With the foregoing general understanding of the principles of the present invention in mind, the details of the first example light auxiliary lighting system 20 will now be described in detail.

Figure 3:
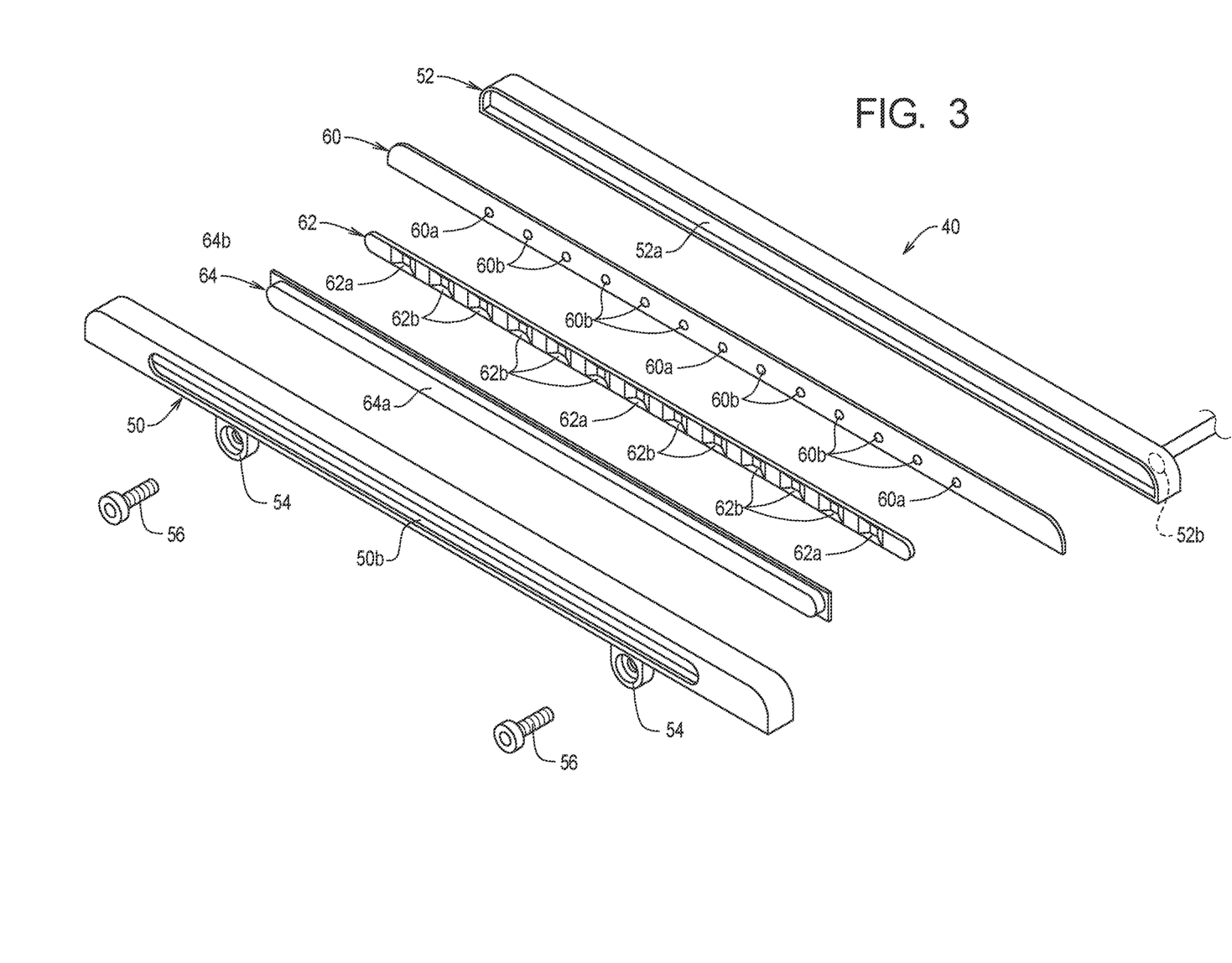
FIG. 3 is a perspective exploded view of the first example light assembly.

The example light assembly 30 comprises a light housing assembly 40, a LED panel assembly 42, a light cable assembly 44, and a light fastener system 46.

The example light housing assembly 40 comprises a first housing member 50 and a second housing member 52. In the first example auxiliary light system 20, the example first housing member 50 further comprises one or more screw tabs 54. In combination with one or more screws 56, the example screw tabs 54 form the example light fastener system 46. The example first housing member 50 defines a first housing member cavity 50a and a lens opening 50b. The example second housing member 52 defines a second housing member cavity 52a and a cable opening 52b. The example LED panel assembly 42 comprises an LED panel 60, a trim member 62, and a lens member 64. The example LED panel 60 is a substantially flat elongate member that supports at least a first type of LED 60a and a second type of LED 60b in an LED array. The example trim member 62 is a substantially flat elongate member that defines a plurality of apertures 62b. The example lens member 64 is an elongate member that defines a lens projection 64a, a lens flange 64b, and a lens cavity 64c.

As perhaps best shown in FIGS. 3-5, the example LED panel 60 is sized and dimensioned to fit within the second housing member cavity 52a. The example trim member 62 is sized and dimensioned to fit within the lens cavity 64c. The lens flange 64b is also sized and dimensioned to fit within the second housing member cavity 52a. The second housing member 52 is sized and dimensioned to fit within the first housing member cavity 50a. The lens projection 64a is sized and dimensioned to extend at least partly through the lens opening 50b defined by the first housing member 50.

Figure 2:
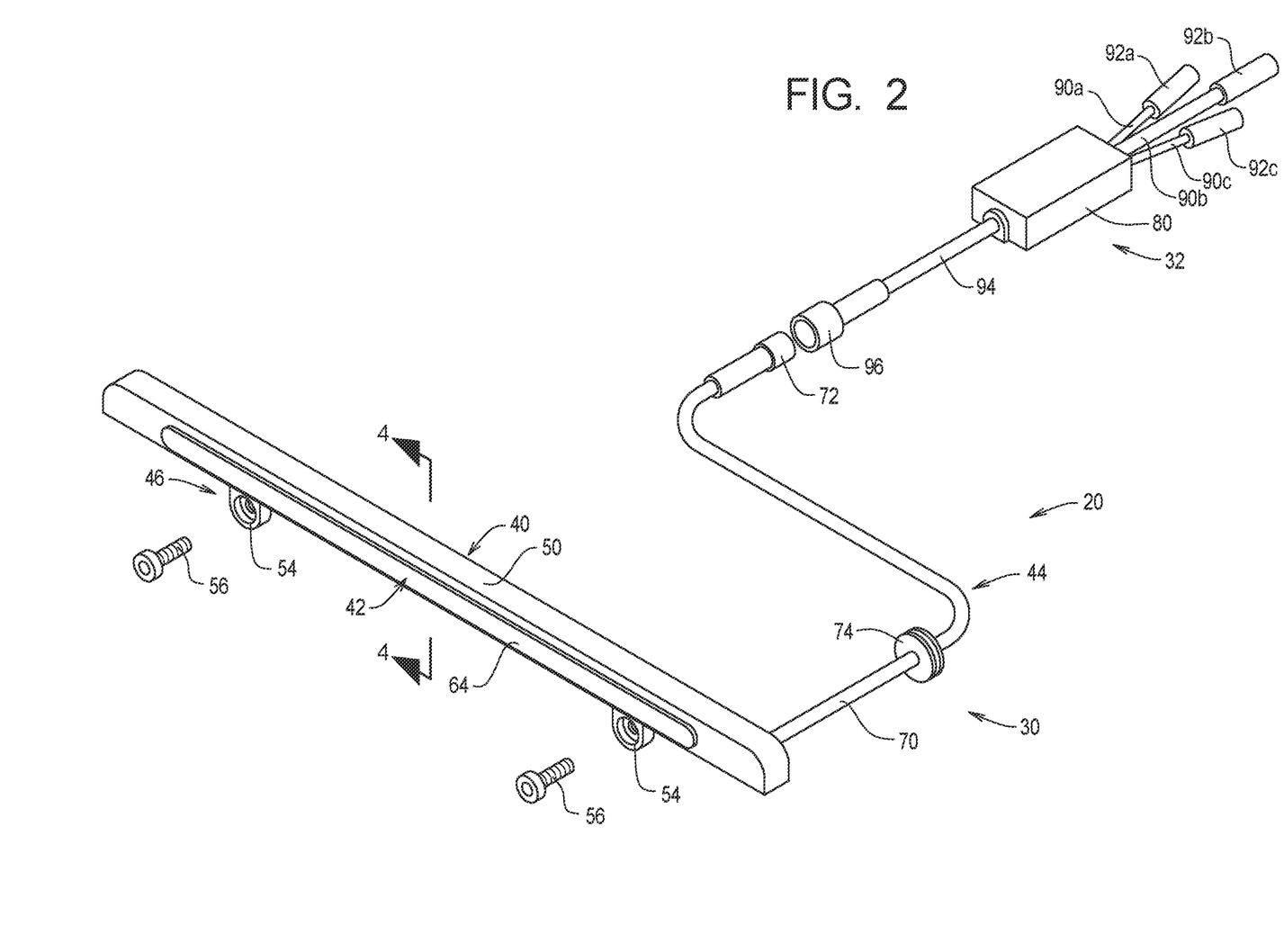
FIG. 2 is a perspective view of the first example lighting system.

The first example driver module 232 comprises a driver housing assembly 80, the driver controller 34, one or more driver input cables 90, one or more driver input connectors 92, one or more driver output cables 94, and one or more driver output connectors 96. More specifically, the first example driver module 232 comprises a two conductor cable 90a associated a 2-pin male plug input connector 92a, a single conductor cable 90b and associated 1-pin female plug input connector 92b, and a single conductor cable 90c and associated 1-pin female plug input connector 92c.

To assemble the first example light assembly 30, the trim member 64 is arranged within the lens cavity 64c and the LED panel 60 is arranged within the second housing member cavity 52a. The lens member 64 is then arranged within the second housing member cavity 52a such that the LED panel is held between the lens member flange 64b and a rear wall of the second housing member 52. The subassembly formed by the second housing member 52, LED panel 60, trim member 62, and lens member 64 is then arranged within the first housing member cavity 50a such that the lens projection 64a is visible through and/or at least partly extends through the lens opening 50b in the first housing member 50. At this point, the LED panel cable 70 extends through an opening in the back wall of the second housing member 52. Adhesive may be used between any two mating surfaces of the components 50, 52, 60, 62, and 64 to hold these components together in the assembled configuration shown in FIG. 4.

The materials from which the components 50, 52, 54, 56, 60, 62, 64, 70, 72, and 74 of the first example light assembly 30 should be capable of performing the functions described herein and to provide a desired level of weather resistance to the first example light assembly 30 during use. In particular, the example first and second housing members 50 and 52 are made of aluminum. The example LED panel 60 is made of a thin, rigid printed circuit board material capable of supporting the LED's 60a and 6b and conductive tracks extending between the LED panel cable 70 and the LED's 60a and 60b. The example trim member 62 is made of injection-molded plastic. The example lens member 64 is made of injection-molded, clear, optical grade polycarbonate but other opacities, features, and colors may be used as desired for functional and/or aesthetic reasons. The example LED panel cable 70, LED panel connector 72, and grommet 74 all are or may be conventional. The example driver housing 80 is made of one or more pieces of injection-molded plastic sealed to define a waterproof compartment, and the example driver controller 34 made be made of a conventional general purpose processing system comprising suitable input, output, memory, and processing to perform the logic functionality described herein. The example driver input cable(s) 90, driver input connector(s) 92, driver output cable(s) 94, and driver output connector(s) 96 all are or may be conventional.

The example LED panel 60 supports at least two groups of LEDs: a first set of X LEDs 60a and a second set of Y LEDs 60b. The first and second sets of LEDs together form the LED array formed by the LEDs 60a and 60b. In the example LED panel 60, the LED array is linear, with a first X LED 60a is arranged at the center of the LED array, second and third X LEDs 60a are arranged at each end of the LED array, first through fifth Y LEDs are arranged between the first and second X LEDs, sixth through tenth Y LEDs are arranged between the first and third X LEDs, the example X LEDs 60a are red, the example Y LEDs 60b are white, and the light array is symmetrically arranged along a horizontal, longitudinal axis defined by the LED panel 60.

The light array displayed by the example LED panel 60 thus may be represented as XYYYYYXYYYYYX. However, other configurations of LEDs 60a and 60b may be used resulting in other light arrays such as XYXYX, XYYXYYX, and XXYYYYXXYYYYXX.

It is also possible that the LEDs 60a and 60b may be grouped in multi-dimensional dimensional arrays instead of the simple one dimensional (linear) array depicted in FIGS. 1-6. The example LED array created by the first example light assembly 30 may be represented as 1×10 (10 lights arranged in a single row). Two-dimensional arrays such as 2×10 (10 lights arranged in two vertically stacked rows) may be used when greater light output is required.

Further, on the example array depicted in FIGS. 1-6, the X lights formed by the LEDs 60a are visually the same and are turned on and/or off at the same time, and the Y lights formed by the LEDs 60b are also visually the same and are turned on and/or off at the same time. However, the X lights formed by the LEDs 60a may be visually different from each other, and the Y lights formed by the LEDs 60b may also be visually different from each other. Further, additional control wiring would allow lights within the sets defining the array to be operated independently or sequentially. In the 1×10 XYYYYYXYYYYYX example depicted and described herein, the Y lights may be turned on sequentially starting from the middle and proceeding towards the ends of the array.

Further, the LED array need not be symmetrically arranged along the longitudinal axis of the LED panel 60. For example, a LED panel assembly of the present invention may define an LED light array for turn signals, which may be best implemented with an unbalanced LED light array. As one example, a left turn array may be XXYYY and a right turn array may be YYYXX. In another example, three LED panels may be supported from the vehicle 22 to provide spaced lighting arrays to provide additional or different functional and/or aesthetic light signals.

Turning now to the electrical system depicted in FIG. 6, it can be seen that the 2-pin male plug 92a receives WHITE1 and WHITE2 two signals, the 1-pin female plug 92b receives a REDHI signal, and the 1-pin female plug 92c receives a REDHI signal that are transmitted to the controller 34. The example controller 34 converts these signals into REDLED and WHITELED signals appropriate for controlling the LEDs 60a and 60b as described herein.

In particular, the first example auxiliary system is operated in any of the three modes:
Parking Light Mode
Brake Light Mode
Reverse Light Mode (takes priority and will shut off red circuits if activated)

The following TABLE A illustrating the logic implemented by the example driver controller 34 to obtain the Parking Light Mode, Brake Light Mode, and Reverse Light Modes:

TABLE A

| Vehicle Status (Parking Lights On-Brake Lights Off) | |
| --- | --- |
| Mode | State |
| Low Red (Parking) | ON |
| High Red (Brake) | OFF |
| White (Reverse) | OFF |

| Vehicle Status (Brake Lights On-Parking Lights On or Off) | |
| --- | --- |
| Mode | State |
| Low Red (Parking) | OFF |
| High Red (Brake) | ON |
| White (Reverse) | OFF |

| Vehicle Status (Reverse Lights On-Parking/Brake Lights On or Off) | |
| --- | --- |
| Mode | State |
| Low Red (Parking) | OFF |
| High Red (Brake) | OFF |
| White (Reverse) | ON |

The example driver controller 34 thus uses the control signals obtained from the example vehicle light control system 26 to generate the control signals REDLED and WHITELED as necessary to implement the modes described in Table A above. More specifically, the control signals generated by the vehicle light control system 26 cannot directly be used to implement the modes of Table A. Instead, the example driver controller 34 implements logic represented by Table A to generate the REDLED and WHITELED signals based on inferences drawn by knowledge of the signals generated by the example vehicle light control system 26. The example driver controller 34 may be programmed to implement, in addition or instead, other modes based on signals generated by the example vehicle light control system 26.

The example driver controller 34 thus can take signals generated by the vehicle light control system for one purpose (reverse lights and parking/brake lights) and generate auxiliary control signals appropriate for the array of lights formed by the LED panel 60 to communicate other information (Parking, Brake, and Reverse)

II. Second Example Auxiliary Lighting System

Figure 7:
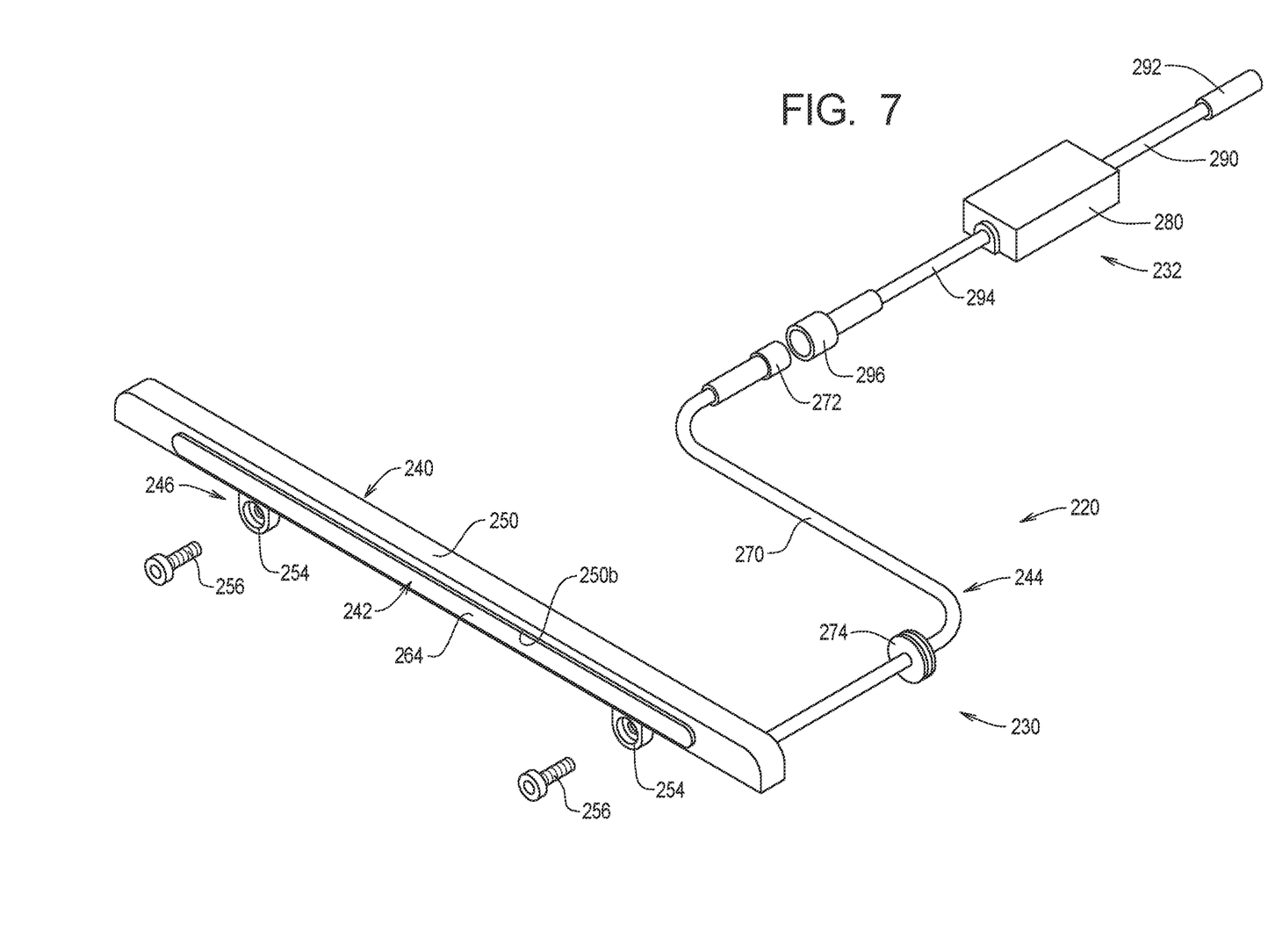
FIG. 7 is a perspective view of a second example lighting system of the present invention.
Figure 8:
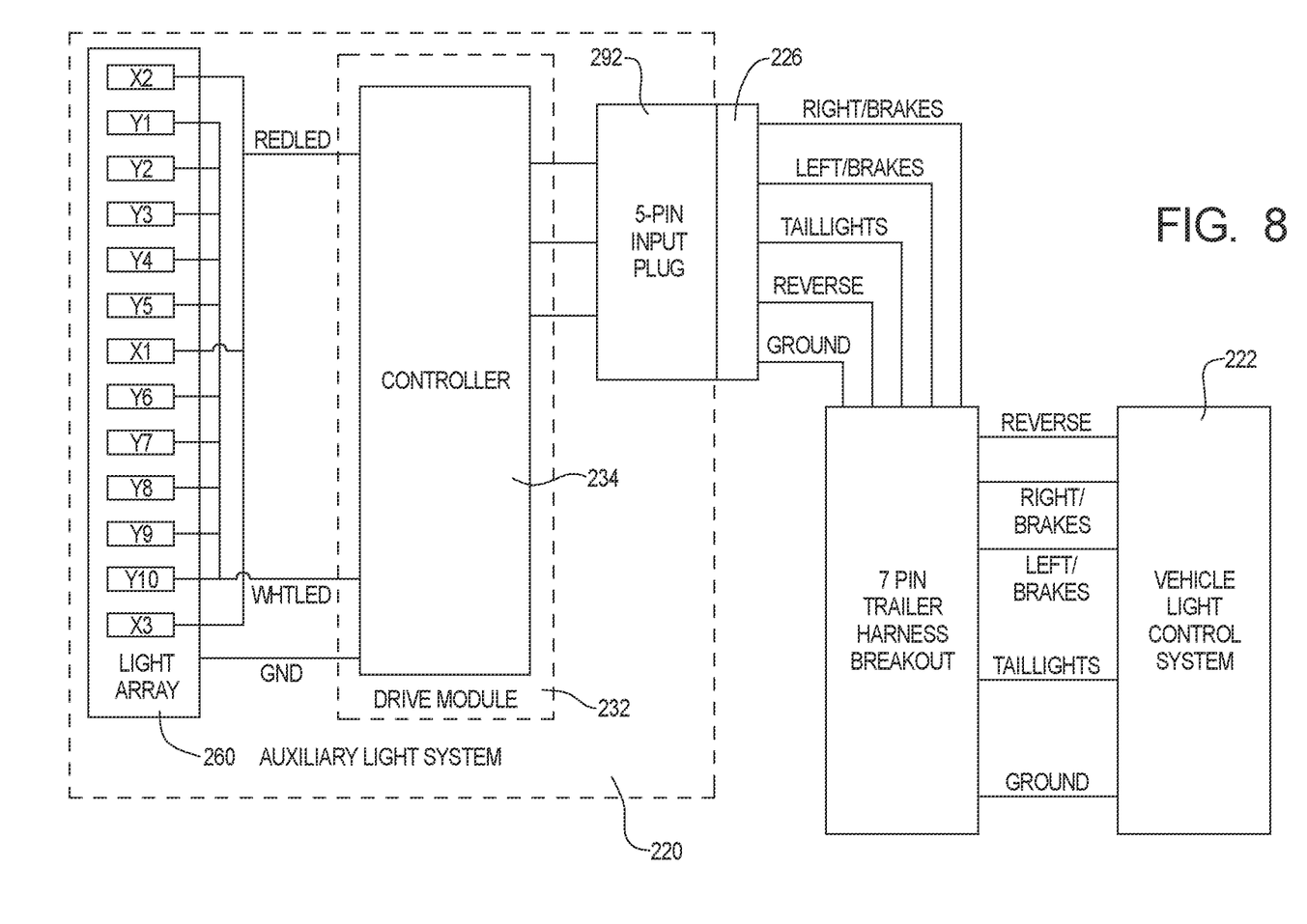
FIG. 8 is a schematic block diagram of the second example auxiliary lighting system of the present invention connected to a vehicle control system using a trailer harness.

Referring now to FIGS. 7 and 8 of the drawing, depicted therein is a second example auxiliary lighting system constructed in accordance with, and embodying, the principles of the present invention. The second example auxiliary lighting system 220 may be adapted to be mounted on a vehicle such as the first example vehicle 22 described above.

The second example auxiliary lighting system 220 comprises a second example light assembly 230 and a second example driver module 232. The example driver module 232 comprises a driver controller 234 configured to be connected between the example vehicle light control system 226 and the second example light assembly 230 such that the second example light assembly generates a plurality (two or more) light signal patterns based on a status of signals generated by the example vehicle light control system 226. Like the example driver module 32, the example driver module 232 is configured such that at least one of the light patterns generated by the light assembly 230 is derived from, but not determined by, the status of the signals generated by the example vehicle light control system 226. The second example lighting assembly 220 is thus configured to control the second example light assembly 230 to generate functional and/or aesthetic light signal patterns beyond the light signal patterns generated by the example vehicle light control system 226 of the second example vehicle 222.

The example light assembly 230 comprises a light housing assembly 240, a LED panel assembly 242, a light cable assembly 244, and a light fastener system 246.

The example light housing assembly 240 comprises a first housing member 250 and a second housing member (not visible). In the second example auxiliary light system 220, the example first housing member 250 further comprises one or more screw tabs 254. In combination with one or more screws 256, the example screw tabs 254 form the example light fastener system 246. The example first housing member 250 defines a second housing member cavity 250a and a lens opening 250b. The example LED panel assembly 242 comprises an LED panel (not visible), a trim member (not visible), and a lens member 264.

The example light cable assembly 244 comprises a light panel cable 270, a light panel connector 272, and a grommet 274.

The second example driver module 232 comprises a driver housing assembly 280, the driver controller 234, one or more driver input cables 290, one or more driver input connectors 292, one or more driver output cables 294, and one or more driver output connectors 296. More specifically, the first example driver module 232 comprises a multi-conductor input cable 290 and a 5-pin input plug input connector 292. The 5-pin input plug connector 292 is configured to receive signals generated by a vehicle light control system and obtained through a trailer harness breakout connector (not shown).

FIG. 8 illustrates detail of one example of electrical connections that can be made using the breakout plug 226 and input connector 292 depicted in FIG. 7.

Aside from the input connector 292 being configured to be connected to the vehicle light control system through a trailer harness breakout connector, the second example auxiliary lighting system 220 may be constructed and operated in basically the same manner as the first example auxiliary lighting system 20 described above and depicted in FIGS. 1-6.

III. Third Example Auxiliary Lighting System

Figure 10:
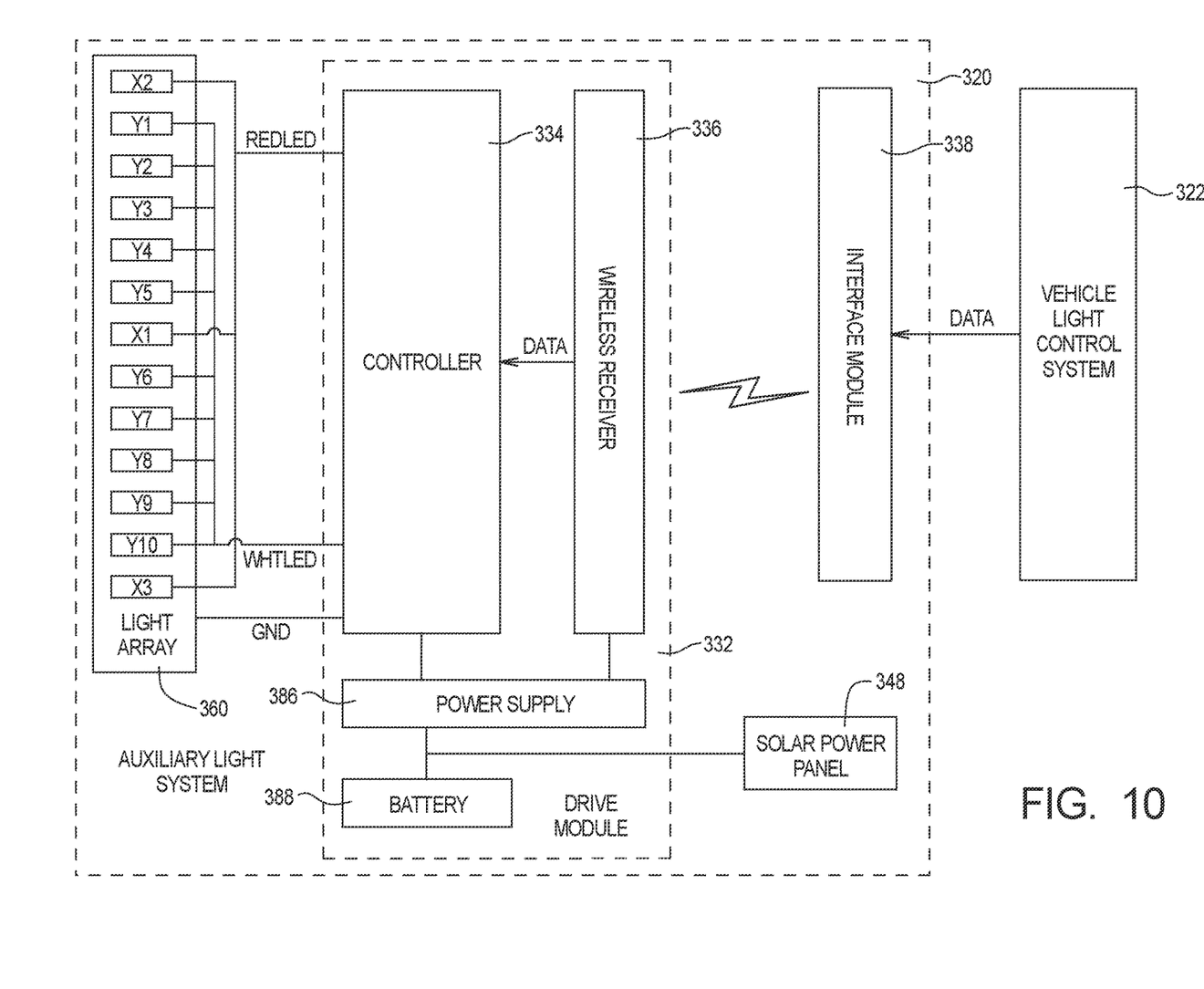
FIG. 10 is a first example schematic block diagram of the third example auxiliary lighting system of the present invention.
Figure 11:
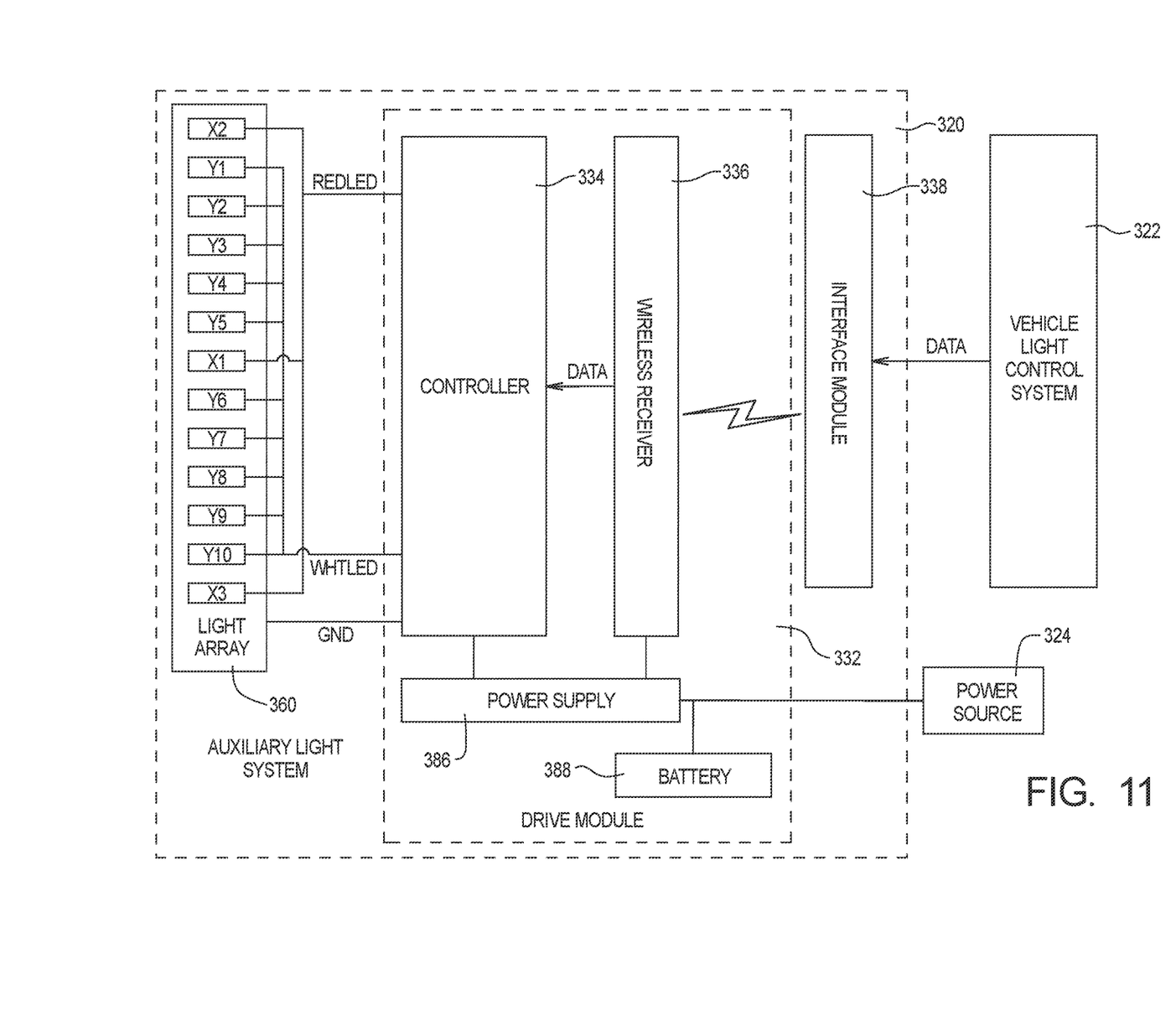
FIG. 11 is a second example schematic block diagram of a variation of the third example auxiliary lighting system of the present invention.
Figure 12:
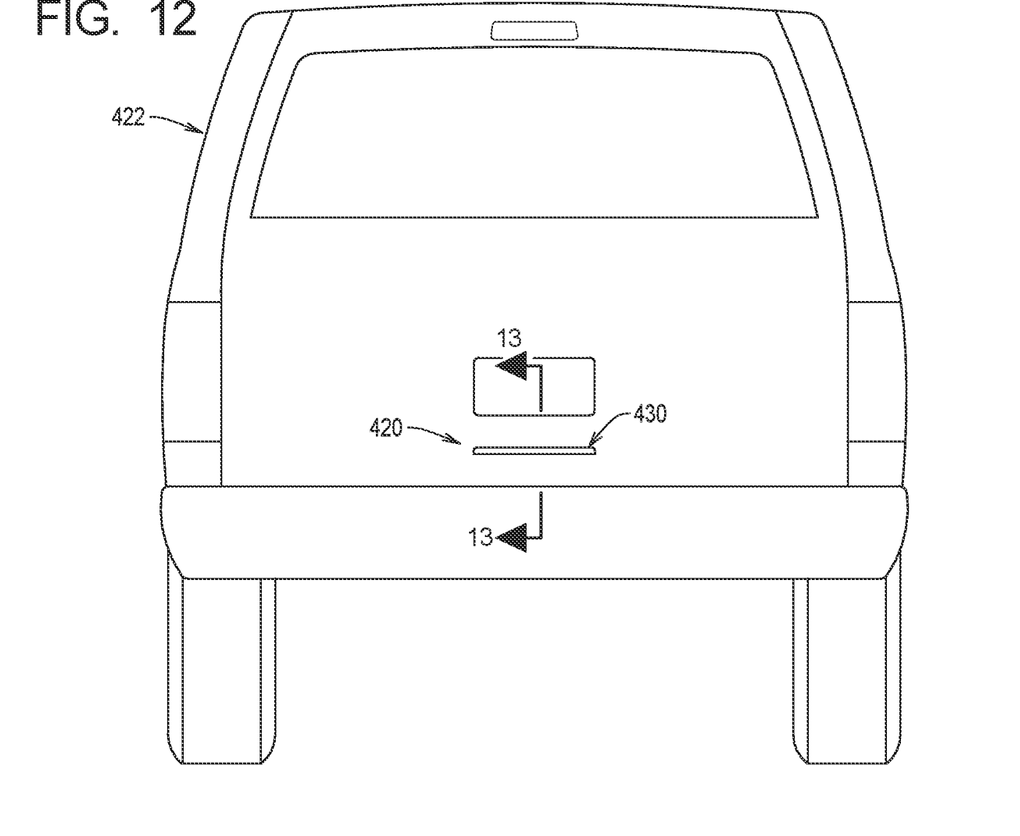
FIG. 12 is a rear elevation view of depicting a second example vehicle supporting a fourth example auxiliary lighting system of the present invention.

Referring now to FIGS. 10-12 of the drawing, depicted therein is a third example auxiliary lighting system constructed in accordance with, and embodying, the principles of the present invention. The third example auxiliary lighting system 320 may be adapted to be mounted on a vehicle such as the first example vehicle 22 described above. The vehicle supporting the third example lighting system 320 further comprises a vehicle light control system 322 and, optionally, a power source 324.

The third example auxiliary lighting system 320 comprises a third example light assembly 330, a third example driver module 332 comprising a driver controller 334 and a wireless receiver 336, and an example interface module 336. The driver controller 334 is configured to be connected between a vehicle light control system and the third example light assembly 330 such that the third example light assembly generates a plurality (two or more) light signal patterns based on a status of signals generated by the example vehicle light control system 326. Like the example driver modules 32 and 232, the example driver module 332 is configured such that at least one of the light patterns generated by the light assembly 330 is derived from, but not determined by, the status of the signals generated by the example vehicle light control system 326. The third example lighting assembly 320 is thus configured to control the third example light assembly 330 to generate functional and/or aesthetic light signal patterns beyond the light signal patterns generated by the example vehicle light control system 326 of the second example vehicle 322.

Figure 9:
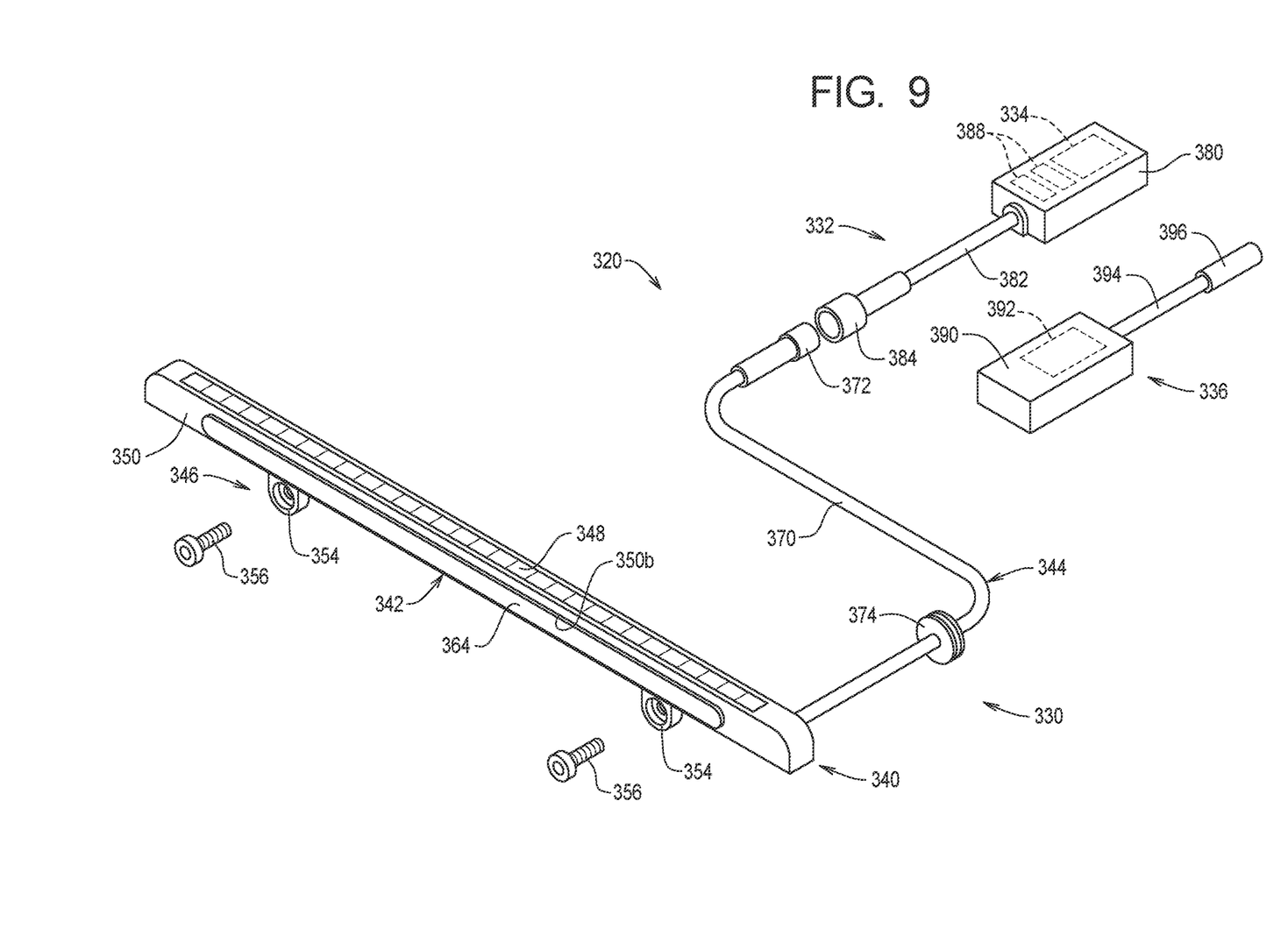
FIG. 9 is a perspective view of a third example lighting system of the present invention.

The example light assembly 330 comprises a light housing assembly 340, a LED panel assembly 342, a light cable assembly 344, and a light fastener system 346.

The example light housing assembly 340 comprises a first housing member 350 and a second housing member (not visible). In the third example auxiliary light system 320, the example first housing member 350 further comprises one or more screw tabs 354. In combination with one or more screws 356, the example screw tabs 354 form the example light fastener system 346. The example first housing member 350 defines a second housing member cavity 350a and a lens opening 350b. The example LED panel assembly 342 comprises an LED panel (not visible), a trim member (not visible), and a lens member 364.

The third example driver module 332 comprises a driver housing assembly 380, the driver controller 334, one or more driver output cables 382, and one or more driver output connectors 384.

The example interface module 336 comprises an interface module housing assembly 390, an interface device 392, one or more interface input cables 394, and one or more interface input connectors 396.

The example interface device 392 is operatively connected to a vehicle light control system. The driver controller 334 and the interface device 392 have wireless communication sub-systems that allow wireless communication between the interface device 392 and the driver controller 334. The example light assembly 330 and driver module 332 may thus be supported on a vehicle at a location distal from wiring of the vehicle light control system without the need to install wiring between the driver module 332 and a convenient access point of the vehicle light control system.

As perhaps best shown in FIG. 10, the example solar cell strip 348 is connected to the power supply 386 and one or more batteries 388 to provide power to the controller 334 and wireless receiver 336. The use of a solar cell, rechargeable batteries, and wireless receiver allows the third example auxiliary lighting system 320 to be located remote from any vehicle provided power source.

FIG. 11 illustrates an alternate embodiment of the third example auxiliary lighting system 320 in which the power supply 386 is connected to the power source 324 of the third example lighting system 320. The third example lighting source 324 may be a source of continuous or discontinuous power on the vehicle, preferably adjacent to a location at which the third example auxiliary lighting system 320 is secured to the vehicle.

In the case of a discontinuous power source 324, the battery 388 may be charged when the power source 324 is operating and the battery 388 can supply power to the driver controller 334 and/or wireless receiver 336 when the power source 324 is not operating. The example solar cell strip 348 may also be used to provide an additional power source for the power supply 385.

Aside from the use of an interface module 336, wireless communication between the interface module 336 and the driver controller 334, solar cell strip 348 and rechargeable batteries 388, and possibly a vehicle power source 324, the third example auxiliary lighting system 320 may be constructed and operated in basically the same manner as any of the example auxiliary lighting systems 20 and 220, described above.

IV. Fourth Example Auxiliary Lighting System

Figure 13:
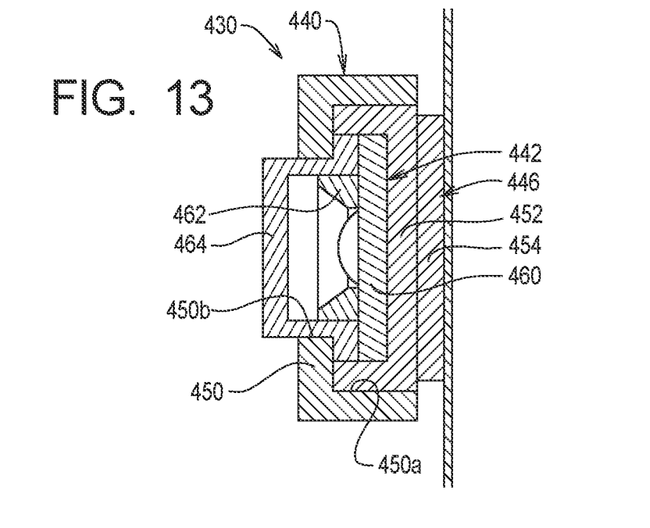
FIG. 13 is a section view taken along lines 13-13 in FIG. 12.

Referring now to FIGS. 12 and 13 of the drawing, depicted therein is a fourth example auxiliary lighting system constructed in accordance with, and embodying, the principles of the present invention. The fourth example auxiliary lighting system 420 may be adapted to be mounted on a second example vehicle 422.

The fourth example auxiliary lighting system 420 comprises a third example light assembly 430 and a third example driver module (not visible in FIGS. 9 and 10) comprising a driver controller (not visible in FIGS. 9 and 10). The driver controller is configured to be connected between a vehicle light control system and the third example light assembly 430 such that the third example light assembly generates a plurality (two or more) light signal patterns based on a status of signals generated by a vehicle light control system (not visible in FIGS. 9 and 10) of the second example vehicle 422. Like the example driver modules 32, 232, and 332, the example driver module is configured such that at least one of the light patterns generated by the light assembly 430 is derived from, but not determined by, the status of the signals generated by the vehicle light control system. The third example lighting assembly 420 is thus configured to control the third example light assembly 430 to generate functional and/or aesthetic light signal patterns beyond the light signal patterns generated by the example vehicle light control system of the vehicle 422.

The example light assembly 430 comprises a light housing assembly 440, a LED panel assembly 442, a light cable assembly (not visible in FIGS. 9 and 10), and a light fastener system 446.

The example light housing assembly 440 comprises a first housing member 450 and a second housing member 452. In the fourth example auxiliary light system 420, the example first housing member 450 further comprises an adhesive layer 454 to form the light fastener system 446. The example first housing member 450 defines a second housing member cavity 450a and a lens opening 450b. The example LED panel assembly 442 comprises an LED panel 460, a trim member 462, and a lens member 464.

The adhesive layer 454 allows the fourth example light assembly 430 to be secured at locations on the example vehicle where screws openings (e.g., license plate mounting openings) are not available.

Aside from the use of the adhesive layer 454, the fourth example auxiliary lighting system 420 may be constructed and operated in basically the same manner as any of the example auxiliary lighting systems 20, 220, and 320 described above.

V. Additional Considerations

One unique feature of example auxiliary lighting systems of the present invention is that the red LEDs are separated into three distinct sections. This arrangement of red LEDs spaced by white LEDs is generally similar to the spacing of clearance lights mandated by law in the United States on large trucks exceeding 80 inches (2032 mm) in width.

The example auxiliary lighting systems of the present invention are intended for use in aftermarket automotive applications to be installed by the end user (not the OEM vehicle manufacturer). The light housing assemblies described and depicted herein are preferably machined (e.g., CNC) metal parts made of aluminum. In particular, the example first and second light housing members are two pieces of machined 6061 aluminum, which are coated in an exterior-grade black anodizing. The mounting holes are positioned 177.8 mm from center to center, which allows the LP-X to be mounted on top of a North American license plate. On the unit's backside, the profile of the license plate may be milled out so the LP-X will nest over the license plate for flush fitment. The example light panel assemblies are typically light-emitting diodes activated by splicing into the factory wiring of the vehicle.

The example auxiliary lighting systems of the present invention may be embodied as a 3-function license plate mounted LED panel for any car, truck, or vehicle. The example auxiliary lighting systems of the present invention is universal and can be manufactured to be held or otherwise secured onto the vehicle using only factory mounting hardware.

The example LED panels described herein may be metal core PCB is bonded to the aluminum body using high thermal conductivity glue. The trim members described herein may be a molded ABS plastic trim piece. The lens member is preferably optical-grade polycarbonate configured to be placed over the LED chips for protection and clarity and sealed to the light assembly housing using a potting compound to create a water-tight seal. The example PCB forming the example LED panels contains 13 LED chips (3 red and 10 white).

A wire cutout is made in the back of the aluminum body to allow three wires to be attached to the PCB forming the LED panel. A jacketed flat wire may be used to reduce the likelihood that the wiring can be arranged over the license plate without being pinched or damaged. These three wires are positive white, positive red, and negative ground. Traces on the board power the red and white chips separately but are controlled by an external control module formed by the example driver controllers described herein.

The external control module is configured to generate outputs signals to the LED chips mounted on the PCB at a constant current and voltage. The output signals are based on which input modes are triggered. Logic is built in to the external control module to prevent the white and red LED chips from activating at the same time, which would lead to mixing of the two colors. The MODE Table A above illustrates the logic which controls the three modes.

By minimizing a form factor of the electronics forming the driver controller and/or increasing the size of the light housing assembly, the driver controller may be moved from separate driver housing assembly into the light housing assembly.

What is claimed is:

1. An auxiliary lighting system for a vehicle comprising a vehicle light control system for generating a set of vehicle light control signals, the auxiliary light assembly comprising:
   a light assembly adapted to be secured at a desired location on the vehicle, the light assembly comprising a light panel assembly configured to support at least a first set of first light sources and a second set of second light sources, where
      the first light sources differ in appearance from the second light sources, and
      the first and second sets of light sources are arranged such that
         at least a first of the second light sources is arranged between first and second of the first light sources, and
         at least a second of the second light sources is arranged between the first and a third of the first light sources;
   a driver controller operatively connected between the vehicle light control system and the light panel assembly; and
   at least three conductors extending between the driver controller and the light assembly; wherein
   the driver controller generates at least first and second auxiliary light control signals based on the vehicle light control signals, where the at least first and second auxiliary light control signals differ from the vehicle light control signals; and
   the at least three conductors carry the at least first and second auxiliary light control signals to the light assembly such that the first auxiliary light control signal operates the first set of light sources and the second auxiliary light control signal operates the second set of light sources.

2. An auxiliary light system as recited in claim 1, in which the light sources of the first set differ in color from the light sources of the second set.

3. An auxiliary light system as recited in claim 1, in which the first and second sets of light sources are arranged such that:
   at least a first plurality of the second light sources is arranged between the first of the first light sources and a second of the first light sources; and
   at least a second plurality of the second light sources is arranged between the first of the first light sources and the third of the first light sources.

4. An auxiliary light system as recited in claim 1, in which the light assembly further comprises a light housing assembly for at least partly enclosing the light panel assembly.

5. An auxiliary light system as recited in claim 1, in which the light panel assembly comprises a light panel, a trim member, and a lens member.

6. An auxiliary light system as recited in claim 4, in which:
   the light panel assembly comprises a light panel, a trim member, and a lens member; and
   the light housing defines a lens opening; wherein
   at least a portion of the lens member is visible through the lens opening.

7. A method of providing auxiliary light signal patterns for a vehicle comprising a vehicle light control system for generating a set of vehicle light control signals, the method comprising the steps of:
   securing a light assembly at a desired location on the vehicle, the light assembly comprising a light panel assembly configured to support at least a first set of first light sources and a second set of second light sources, where
      the first light sources differ in appearance from the second light sources, and
      the first and second sets of light sources are arranged such that
         at least a first of the second light sources is arranged between first and second of the first light sources, and
         at least a second of the second light sources is arranged between the first and a third of the first light sources;
   operatively connecting a driver controller between the vehicle light control system and the light panel assembly by arranging at least three conductors to extend between the driver controller and the light panel assembly;
   operating the driver controller to generate at least first and second auxiliary light control signals based on the vehicle light control signals, where the at least first and second auxiliary light control signals differ from the vehicle light control signals; and
   arranging the at least three conductors to carry the at least first and second auxiliary light control signals from the driver controller to the light assembly such that the first auxiliary light control signal operates the first set of light sources and the second auxiliary light control signal operates the second set of light sources.

8. A method as recited in claim 7, in which the light sources of the first set differ in color from the light sources of the second set.

9. A method as recited in claim 7, further comprising the steps of arranging the first and second sets of light sources such that:
   at least a first plurality of the second light sources is arranged between the first of the first light sources and a second of the first light sources; and
   at least a second plurality of the second light sources is arranged between the first of the first light sources and the third of the first light sources.

10. A method as recited in claim 7, in which the step of providing the light assembly further comprises the step of providing a light housing assembly for at least partly enclosing the light panel assembly.

11. A method as recited in claim 7, in which the step of providing the light panel assembly comprises the steps of providing a light panel, providing a trim member, and providing a lens member.

12. A method as recited in claim 10, in which:
   the step of providing the light panel assembly comprises the steps of providing a light panel, providing a trim member, and providing a lens member; and
   the step of providing the light housing assembly comprises the step of forming a lens opening in the light housing assembly; and the lens member is arranged within the light housing assembly such that at least a portion of the lens member is visible through the lens opening.

13. An auxiliary lighting system for a vehicle comprising a vehicle light control system for generating a set of vehicle light control signals, the auxiliary light assembly comprising:
- a light assembly comprising
  - a light housing adapted to be secured at a desired location on the vehicle, and
  - a light panel assembly comprising a light panel configured to support at least a first set of first light sources, a second set of second light sources, and a lens member, where
    - the first light sources differ in appearance from the second light sources, and
    - the first and second sets of light sources are arranged such that
      - at least a first of the second light sources is arranged between first and second of the first light sources, and
      - at least a second of the second light sources is arranged between the first and a third of the first light sources;
- a driver controller operatively connected to the vehicle light control system; and
- at least three conductors extending between the driver controller and the light sources of light panel assembly; wherein
  - the driver controller generates at least first and second auxiliary light control signals based on the vehicle light control signals, where the at least first and second auxiliary light control signals differ from the vehicle light control signals; and
  - the at least three conductors carry the at least first and second auxiliary light control signals to the light assembly such that the first auxiliary light control signal operates the first set of light sources and the second auxiliary light control signal operates the second set of light sources.

14. An auxiliary light system as recited in claim 13, in which the light sources of the first set differ in color from the light sources of the second set.

15. An auxiliary light system as recited in claim 13, in which the first and second sets of light sources are arranged such that:
- the first light sources are symmetrically arranged along a longitudinal axis of the light panel assembly; and
- the second light sources are symmetrically arranged along a longitudinal axis of the light panel assembly.

16. An auxiliary light system as recited in claim 15, in which:
- the light panel assembly further comprises a light panel and a trim member; and
- the light housing defines a lens opening; wherein
- at least a portion of the lens member is visible through the lens opening.

* * * * *